April 25, 1939. J. KEULERS 2,155,602
APPARATUS FOR TESTING PIPE CONNECTIONS
Filed Oct. 15, 1937
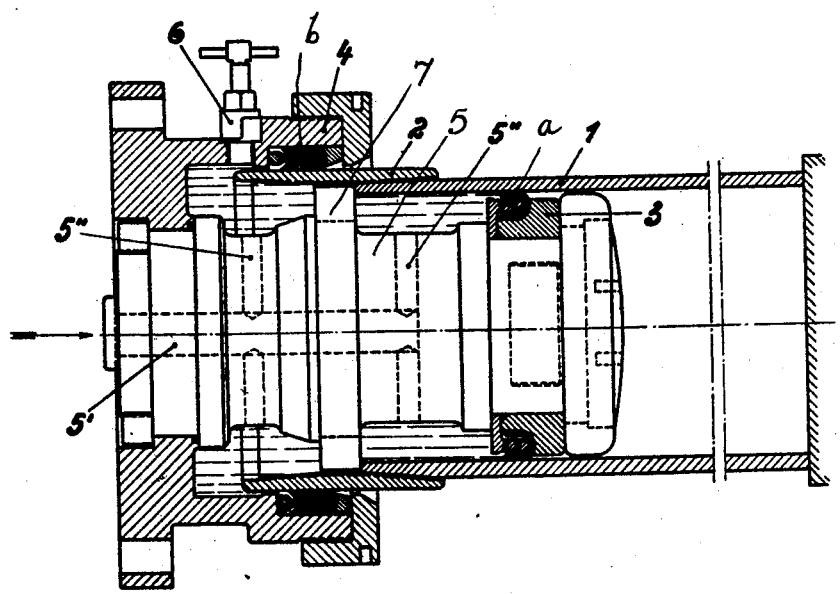
J. Keulers
Inventor

UNITED STATES PATENT OFFICE

2,155,602

APPARATUS FOR TESTING PIPE CONNECTIONS

Jakob Keulers, Hilden, Germany, assignor to the firm Deutsche Röhrenwerke Aktiengesellschaft, Dusseldorf, Germany Application October 15, 1937, Serial No. 169,322
In Germany October 27, 1936

1 Claim. (Cl. 73—51)

The present invention relates to apparatus for testing pipe connections and more particularly pertains to means for checking such connections attached to ends of pipes.

Pipes for conveying a liquid or gaseous medium must be tested under pressure to determine the tightness of the treated or shaped pipe ends. This testing has up to the present been carried out by placing the whole pipe in a special press, and then applying a pressure medium filling the whole interior of the pipe. Such a pressure test represents the second examination to which the pipe is submitted, as it has been previously submitted directly after its production to a pressure-test by filling water into the pipe, the pipe ends being still smooth and untreated. The usual renewed testing of the whole pipe for determining the tightness of the pipe ends or of the connections between the pipe ends and the pipe joint pieces is for the pipe manufacturers very undesirable, as filling the whole tube with water, discharging the water again and the transport of the pipe to the press on which the pressure test is to be carried out, require much time, and is consequently expensive. The known method possesses further inconveniences in that the water moistens the whole inner surface of the pipe which must then be dried, for instance by heating the pipe, unless a coat of paint is applied prior to the water test.

According to the invention it is possible to avoid these inconveniences by inserting a packing body directly behind the pipe end to be tested, which closes the interior of the pipe. The exterior of the pipe ends or the pipe connecting pieces on the outer side are also embraced by a packing member, and the pressure medium is introduced merely into the comparatively small shut off space which is formed at the end of the pipe. This method possesses the advantage in that it permits considerably quicker testing by pressure and requires much less pressure liquid than the commonly applied method. A further advantage results from the fact that the pipe tested by pressure is moistened merely at the ends, whereas the greater portion of the inner surface of the pipe remains dry. It is therefor not necessary to submit the pipe to a separate drying operation.

The apparatus for carrying out the method briefly described above is particularly simple. A device is employed which consists of a packing body which is employed to close the interior of the pipe. The end of the pipe to be tested by pressure is covered with a head having a packing which engages over the pipe end or over the pipe connecting piece and the head is connected with the packing body by a hollow body through which the pressure medium is supplied. Such a device is handy and light, so that it can be mounted without any difficulty on the pipe end to be examined. Conveying of the pipes to a separate press is no longer necessary.

The device mentioned above is illustrated, by way of example, in the single figure of the accompanying drawing.

On the end of the pipe 1 an internally threaded sleeve 2 is screwed. The connection between these two elements has to be examined to determine the tightness of the joint. With this object in view a packing body 3 is inserted into the pipe so that it seals the interior of the pipe end to be examined by pressure. The pipe end or the sleeve end is closed towards the exterior by a head 4 engaging over the sleeve 2 and packing the same. The connection between head 4 and packing body 3 is formed by a hollow body 5, through which the central bore 5' of which and through the radial bores 5'' the pressure medium is conducted into the pressure space. The hollow body 5 is supported in the center of the pipe so as to be axially aligned with the axis of the nipple 2 by means of an annular flange 7. A tap 6 is mounted on the head 4 of the device and remains open until the water under pressure has filled the packing space, the tap being only then closed for enabling the pressure test.

The operation of the apparatus will be apparent from the drawing. The water under pressure enters the body member 5 through the bore 5' and passes through the radially extending bores 5'' into the space between the packing sleeves $a$ and $b$. The body member 5 is connected with the head 4 while the head is sealed by the packing sleeve $b$. The packing body 3 is attached to the body member 5 and the sleeve $a$ seals the interior of the pipe 1. As the liquid pressure increases, the packing sleeve $a$ is pressed more tightly against the pipe wall and against the packing body 3. The packing sleeve $b$ functions in a similar manner to seal the exterior of the connecting member 2.

The testing apparatus is applied in a very simple manner to the pipe joint to be tested and when water under pressure is admitted, a reliable packing of the inner and outer surfaces of the pipe is effected without any mechanical auxiliary means. The tightness of the pipe joint can be determined not only by means of the pressure gauge but also by observing the joint between the pipe 1 and the sleeve 2 because the joint is outside the head 4. The testing device can also be removed in a simple manner after the pressure test by opening the valve 6.

I claim:—

Apparatus for testing the tightness of a joint between one end of a pipe and a connecting member attached thereto comprising, a packing body adapted to be inserted in said end of said pipe, a packing sleeve carried by the packing body so as to engage the interior of the pipe, a head member embracing the connecting member, a second packing sleeve carried by said head member engaging the exterior of the connecting member, a body member having an axial bore connecting said packing member and said head member so as to prevent axial movement of the packing member with respect to the head member, said body member being smaller than the pipe and having a flange providing two spaces between said packing sleeves, and said body member having radial openings therein connecting said spaces with the axial bore whereby fluid pressure may be introduced into said spaces.

JAKOB KEULERS.